United States Patent [19]
Gartner

[11] 3,729,965
[45] May 1, 1973

[54] MULTIPLE PART KEY FOR CONVENTIONAL LOCKS

[76] Inventor: Klaus W. Gartner, 5711 Ravenspur Drive, Palos Verdes Peninsula, Calif. 90274

[22] Filed: Apr. 29, 1971

[21] Appl. No.: 138,675

[52] U.S. Cl. .................................. 70/395, 70/408
[51] Int. Cl. ........................................ E05b 19/10
[58] Field of Search ............... 70/395, 393, 398, 70/408

[56] References Cited

UNITED STATES PATENTS 3,349,589  10/1967  Fricke ............................. 70/395
2,198,484  4/1940   Merkl .............................. 70/395

FOREIGN PATENTS OR APPLICATIONS 680,416  8/1939  Germany ........................... 70/395
85,084   4/1965  France ............................. 70/395

Primary Examiner—Robert L. Wolfe
Attorney—Miketta, Glenny, Poms & Smith

[57] ABSTRACT

The multiple part key includes an elongated extruded shank having a lock end portion and an opposite apertured end portion, and includes a hilt having a guideway with opposed shoulder portions therein for receiving the opposite end portion to be secured therein by opposed shoulder portions from the hilt extending into an aperture in the shank. In a second embodiment, the opposite end portion of the shank is located in the guideway portion of an inner part of the hilt, with the shank aperture around a hilt inner part shoulder portion, and this assembly is telescoped into an outer hilt part with the shank extending through a guideway portion of the outer hilt part to extend therefrom while tabs from the hilt inner part extend into openings in the hilt outer part to locate the sides of the hilt outer part around the hilt inner part to secure the shank and the hilt together.

14 Claims, 10 Drawing Figures

Patented May 1, 1973
3,729,965
2 Sheets-Sheet 1
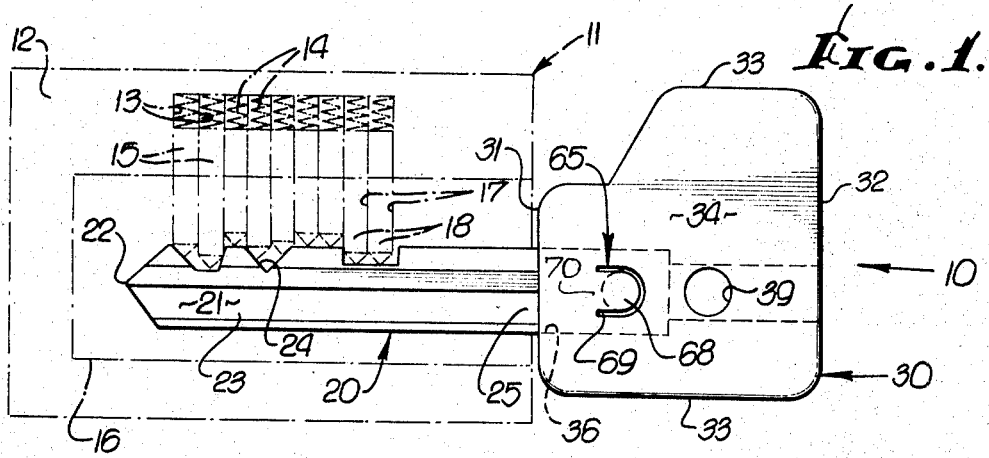
Fig. 1.
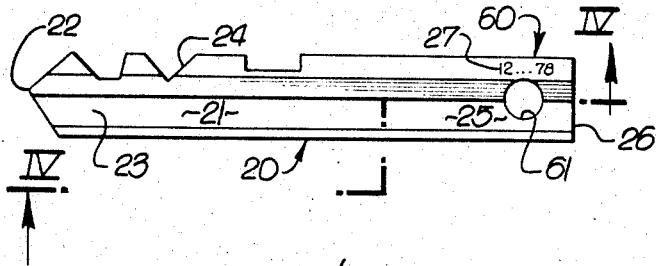
Fig. 2.
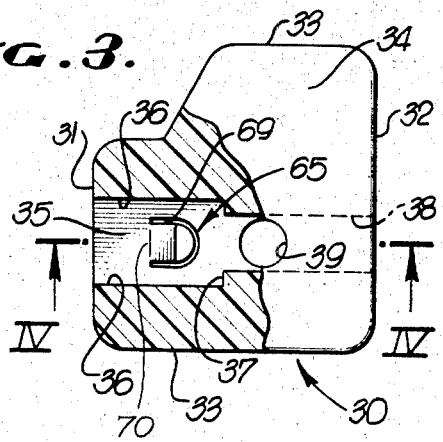
Fig. 3.
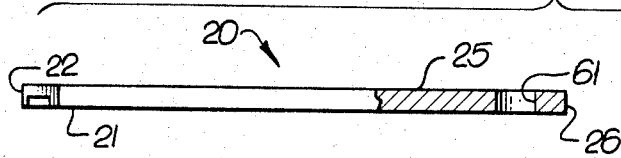
Fig. 4.
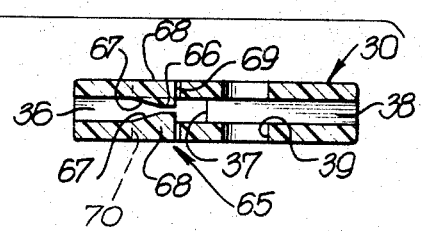
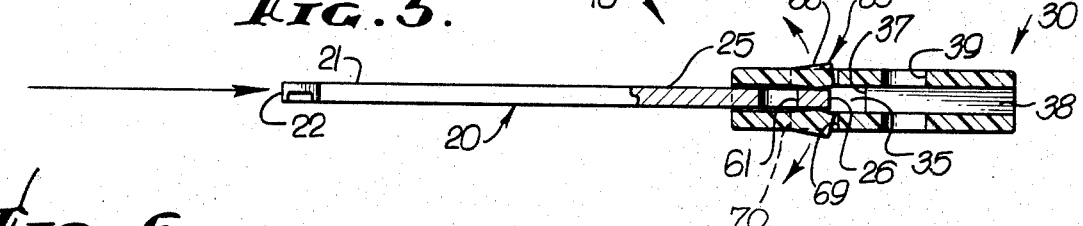
Fig. 5.
Fig. 6.
INVENTOR.
KLAUS W. GARTNER
BY
Miketta, Glenny, Poms & Smith
ATTORNEYS.

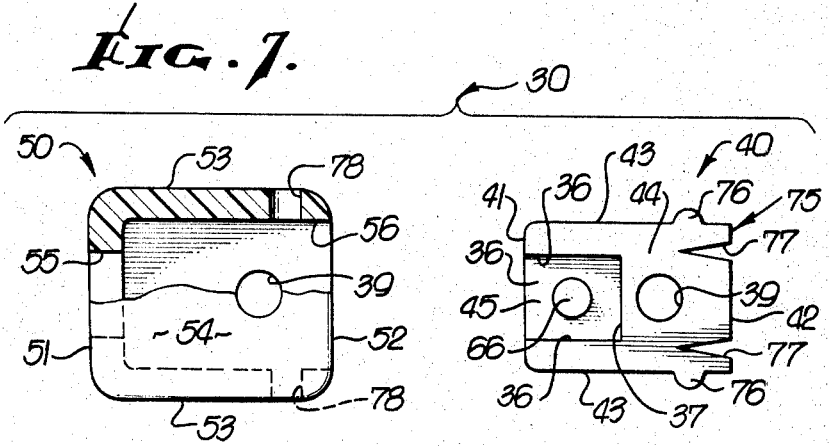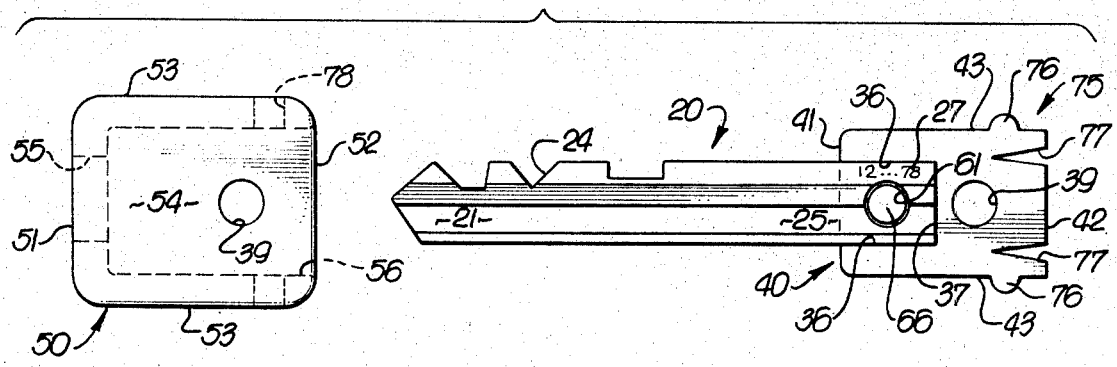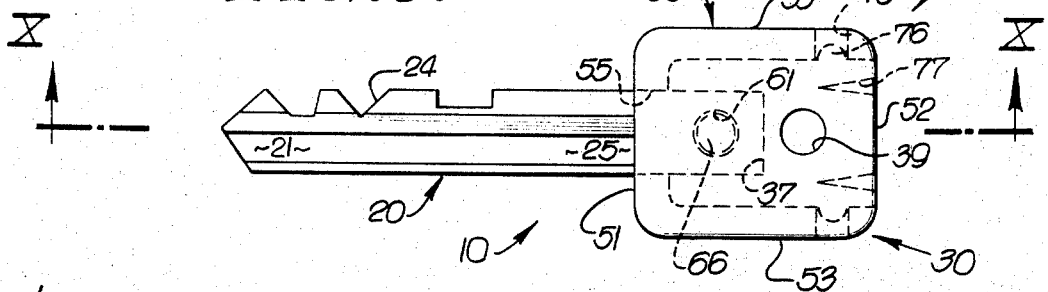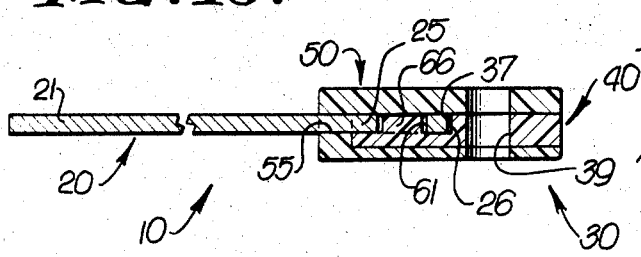

MULTIPLE PART KEY FOR CONVENTIONAL LOCKS

BACKGROUND OF THE INVENTION

This invention relates to locks and more particularly to a multiple part key for operating conventional locks.

The multiple part key, of this invention, is a further simplification and improvement on my invention of a key and holder disclosed in my copending patent application Ser. No. 5,479, filed Jan. 26, 1970.

Heretofore, a key for operating a conventional lock has been an integral, one-piece metal blank having an elongated shank for insertion into the lock itself and having an enlarged opposite head or handle end portion which was manually grasped for exerting a torque on the key to open the lock. The key shank was provided with a number of different sized transverse notches which mated with the tumblers of a mating lock enabling the key to open that lock. As the number of transverse notches was limited, most lock manufacturers also provided the shank end of a key with a plurality of longitudinal grooves which mated with longitudinal grooves in the lock so that the key for a particular lock must have the correct combinations of longitudinal grooves and transverse notches to open the lock.

The transverse notches must be individually ground into the key blank, as their shape and location is different for each key. Heretofore the longitudinal grooves of a conventional key shank were also ground into each individual key blank even though appreciable numbers of key blanks were made having identical grooves in the sides thereof. There are less expensive methods than grinding for providing longitudinal grooves in an elongated piece of metal. Extruding the grooves in the elongated piece of metal is one such method, but heretofore this method has not been used in the making of keys because the extruding process could not economically provide grooves along only a portion of the key blank, i.e. along the shank only, as is required for a one-piece key. If, however, the key were constructed of separate parts, such as a separate shank and a separate hilt, the key shank could be extruded to provide the longitudinal grooves therein, and the cost of grinding these grooves into the key blank could be eliminated. Furthermore, a long strip of metal with such grooves could be extruded and then cut to key length. As a further feature of such a multiple part key, the shape, coloring, design, indicia and decoration of the hilt could be selected to suit the tastes of the buyer or to carry desired information, identification, etc. independently of the shape of the elongated end, which is of course, dictated by the lock the key is to open. Such a multiple part key would need to be easily assembled into a complete key if the buyer is expected to assemble the parts once he has selected a hilt to receive the shank cut for his lock.

BRIEF DESCRIPTION OF THE INVENTION

Therefore, it is the primary object of this invention to provide a novel multiple part key for use in conventional locks.

Other and additional objects of this invention are to provide such a multiple part key which can use inexpensively extruded key shanks; to provide such a multiple part key from shanks which may be extruded in long strips and cut to key length; to provide such a multiple part key having a variety of sizes, shapes, and decorations of hilts therefor, all of which lockingly receive the key shank; and to provide such a multiple part key which is inexpensive to manufacture, easy to assemble, and durable once assembled for a long useful life.

Generally stated, the multiple part key for use with conventional locks includes an elongated key shank having one end portion suitably shaped for insertion into the lock and an opposite end portion, a separate hilt having an elongated key shank guideway therein for receiving the opposite end portion of the shank and mounting means for securing the shank and hilt together. The shank may have an indentation for receiving a shoulder portion of the hilt to hold the two together. The hilt may be a single part or constructed of multiple mating and interlocking parts. The end of the guideway may be shaped to mate with the opposite end of the shank.

Generally stated, the method of assembly of the within multiple part key, including a key shank with a lock end portion and an opposite end portion and a separate hilt with an elongated guideway for receiving said opposite end portion of the shank, includes the steps of grasping the lock end portion of the shank, grasping the hilt, aligning the opposite end of the shank with the guideway of the hilt, inserting the opposite end portion of the shank into the guideway and securing the shank to the hilt. The method may include causing the opposite end to engage a ramp portion for moving a shoulder portion over the opposite end portion until a shoulder drops into an indentation in the shank. The method may also include inserting the opposite end portion into a portion of the guideway in a first part of the hilt and inserting the shank and first part so assembled into a cavity in a second part of the hilt and interlocking the parts.

BRIEF DESCRIPTION OF THE DRAWINGS:

FIG. 1 is a side elevational view of a multiple part key, according to this invention, shown in a conventional lock, outlined in phantom lines;

FIG. 2 is a side elevational view of a key shank for use with the multiple part key;

FIG. 3 is a partially broken-away, side elevational view of a hilt for use with the multiple part key;

FIGS. 4, 5 and 6 are cross-sectional views of the shank and hilt taken along the plane IV—IV of FIGS. 2 and 3 showing successive steps in the assembly of the multiple part key;

FIG. 7 is a side elevational view of a second embodiment of the hilt, showing the two parts thereof;

FIGS. 8 and 9 are side elevational views of successive steps in the assembly of the multiple part key with the second embodiment of the hilt; and FIG. 10 is a cross-sectional elevational view taken along the plane X—X of FIG. 9 showing the assembled multiple part key according to this invention.

DETAILED DESCRIPTION OF THE PREFERRED EMBODIMENT

Referring now to the drawings and particularly to FIG. 1, the multiple part key according to this invention is generally denoted by the number 10. The key 10 is shown located in a conventional illustrative lock 11, outlined in phantom lines. The lock 11 has a hollow housing 12 containing a plurality of vertical, tumbler cavities 13, each containing a spring 14 biasing an upper tumbler half 15 downwardly. The housing 12 also contains a cylinder 16 having a key receiving slot therein into which a like plurality of tumbler holes 17 open to be filled with lower tumbler halves 18. When the lock is empty or when the wrong key 10 is inserted into the cylinder 16 thereof, the juncture of at least one of the upper and lower tumbler halves 15 and 18 does not occur at the juncture of the housing 12 with the cylinder 16, so that the cylinder 16 cannot be rotated relative the housing 12 but remains in the locked position. However, as shown in FIG. 1, when the proper key 10 is inserted into the cylinder 16 the junctures of all the upper end lower tumbler halves 15 and 18 occur along the juncture of the housing 12 with the cylinder 16, permitting the cylinder 16 to rotate relative the housing 12 to the unlocked position.

Generally the multiple part key according to this invention for use with the lock 11, includes a key blade or key shank 20, a key head, key handle, key shank housing member, or key hilt 30, and mounting means 60 for mounting the two together into a key 10. The hilt 30 may be a one-piece hilt, as in the first embodiment of FIGS. 1–6, or a two-part hilt, as in the second embodiment of FIGS. 7–10.

The multiple part key according to the embodiments of this invention may be made of all plastic, i.e., plastic molted or extruded shanks and molded hilts or heads. The use of such plastic hilts or heads allows pairs of them to be interconnected if so desired. Also such use of plastic allows the imprinting, molding or otherwise providing of desired indicia on the key head or hilt. By way of example, at present, hotel and motel room identification cards are attached to the keys by a separate ring. The tag also usually has a return address on it in case the key is lost or inadvertently carried away by a hotel guest. This type of indicia may be, according to the key construction of the present invention, formed in or printed on the separate hilt of snap-on key head to personalize or individualize the key for any particular user.

Referring now to FIG. 2 the key shank 20 has a lock end portion 21 for insertion into the lock cylinder 16 and a hilt end portion 25 for being secured to the hilt 30. The lock end portion 21 is conventionally shaped having a pointed end 22 from which longitudinal grooves 23 extend rearwardly along the shank 20. The grooves 23 are specially shaped for each series of locks 11 and it is contemplated that they will extend the full length of the shank 20, thereby permitting the shank 20 to be extruded. In such an extrusion process, a strip of metal or plastic would be extruded with the grooves 23 therein and the strip would be cut to the proper length to provide shanks 20. The lock end portion 21 also is provided with transverse notches 24 which are unique for each lock 11 to properly locate the tumblers 15 and 18 of the lock 11 for opening. The transverse notches 24 would be cut, probably by grinding, once the extruded shank 20 is cut to length.

The hilt end portion 25 of the shank 20 is on the opposite end of the shank 20 from the lock end portion 21 and includes an opposite end 26 suitably shaped for mating with the hilt 30 as will appear later. In the illustrated embodiment of the shank 20, the opposite end 26 is generally at right angles to the sides and edges of the hilt end portion 25. The hilt end portion 25 may have key identification numbers 27 formed therein, which when the key is assembled will be hidden by the hilt 30.

The first embodiment of the hilt 30 is shown in FIGS. 1–6 and has a single, unitary body or part. The hilt 30 has a front edge 31, a rear edge 32, side edges 33 and side surfaces 34 which can provide many different shapes and colors for having impressed thereon many different designs to provide individualized hilts 30. The hilt 30 also has a longitudinal guideway 35, opening to the front edge, with guideway sides 36 extending rearwardly therefrom into the hilt 30 to terminate at an end wall 37. The sides 36 and end wall 37 of the guideway define a space suitably sized to snugly receive the hilt end portion 25 of the shank 20. In the illustrative embodiment, the end wall 37 is generally at right angles to the sides 36 to mate with the end 26 of the shank 20. It is contemplated that the hilt 30 will be molded out of plastic and so a relief passage 38 is provided from the end wall 37 to the rear edge 32 to aid in the molding process. The hilt is completed by the provision of a hole 39 therethrough sized for receiving therethrough a key holder of some type, such as a conventional key chain or key ring (not shown). The complete hilt 30 is ready to receive the shank 20 with the shank 20 releasably secured therein by manually operated mounting means 60.

The manually operated mounting means 60 is for securing the hilt end portion 25 in the guideway 35 of the hilt 30. As best seen in FIG 2, the means 50 includes the provision of an indentation 61 in the hilt end portion 25 of the shank 20 which in the illustrative shank 20 is an aperture. The manually operable mounting means 60 also includes the provision of holding means 65 associated with the hilt 30.

The holding means 65 of the first embodiment of the hilt 30 includes the provision of a pair of opposed shoulder portions 66 spaced from the end of the end wall 37 a distance equal to the spacing of the indentation 61 from the end 26 of the shank 20. The shoulder portions 66 extend into the guideway 35 from opposite sides 36 thereof and are sized for being received in the indentation 61 of the shank 20. Immediately preceding the shoulder portions 66 are ramp portions 67 which merge smoothly from the shoulder portions 66 into the sides 36 on which they are located. Both the shoulder portions 66 and the ramp portions 67 are located on tongue portions 68 formed in the side surfaces 34 by U-shaped cutouts 69 around three sides of the tongue portions 68. The tongue portions 68 are fastened to the rest of the hilt by a fourth side 70 which will bend easily to enable the tongue portions 69 to pivot outwardly for receiving the shank 20 in the hilt 30.

The first embodiment of the multiple part key is assembled by grasping the lock end portion 22 of the shank 20 in one hand and the hilt 30 in the other hand. The hilt end 26 of the shank 20 is aligned with the open end of the guideway 35 of the hilt 30, as is shown in FIG. 4, and the hilt end portion 25 inserted longitudinally into the guideway 35. As the shank 20 is being inserted in the hilt 30, the end 26 thereof will engage the ramp portions 67 of the hilt 30, to cammingly pivot the tongue portions 69 oppositely outwardly against the resilience of the hilt 30, as is shown in FIG. 5, until the shoulder portions 66 will pass along the sides of the shank 20. As the end 26 of the shank 20 bottoms against the end wall 37 of the hilt 30, the shoulder portions 66 will be located at the indentation 61 of the shank 20 whereupon the resilience of the hilt 30 will pivot the tongue portions 60, moving the shoulder portions 66 into the indentation, as shown in FIG. 6, to secure the shank 20 in the hilt 30 and to complete the assembly of the multiple part key 10.

The shank 20 will remain in the hilt 30 for operating locks 11 until the shank 20 is forcibly pulled from the hilt 30, for example to replace the hilt 30 with another shape or design of hilt 30, but until forcibly parted the hilt 30 and the shank 20 will remain assembled as a key.

Referring now to FIGS. 7-10, a second embodiment of the hilt 30 is shown for use with the same shank 20. The second embodiment of the hilt 30 has two parts, a first or inner part 40 and a second or outer part 50. As best seen in the right side of FIG. 7, the part 40 has a front edge 41, a rear edge 42, side edges 43 and side surfaces 44. The first part 40 contains a portion 45 of the guideway 35 which is a side opening depression with three sides 36, an end wall 37, and a shoulder portion 66 suitably spaced from the end wall 37 for mating with the indentation 61 of the shank 20. The first part also has a portion of hole 39 therethrough adjacent the rear edge 42.

The second part 50 as best seen in the left side of FIG. 7, has a front edge 51, a rear edge 52, side edges 53 and side surfaces 54. The part 50 has a portion 55 of the guideway 35 which runs from the front edge 51 to a first part receiving cavity 56 in the outer part 50 and opening to the rear edge 52. The cavity 56 is suitably sized so that it will snugly receive the first part 40 with the portions 45 and 55 aligned to form the guideway 35. The second part 50 has the rest of the hole 39 therethrough.

The first and second parts 40 and 50 are provided with interlocking means 75 for interlocking the parts 40 and 50 once mated together. In the alternative preferred embodiment, the interlocking means 75 includes the provision of outwardly protruding opposed tabs 76 extending from the side edges 43 adjacent the rear edge 42 of the inner part 40. The rear edge 42 inwardly of each tab 76 is provided with undercuts 77 therein which permit the tabs 76 to pivot inwardly when needed and thereafter to springingly return to the outward protruding position. The interlocking means 75 of the second part 50 includes the provision of opposed openings 78 extending from the cavity 56 through the part 50 to the side edge 53 adjacent the rear edge 52. The openings 78 are sized and located to receive tabs 76 therein when the first part 40 is matingly located in the cavity 56 of the second part 50 to releasably interlock the two parts 40 and 50.

Again, the first part 40, once mated with the second part 50, will remain interlocked by the mating of the tabs 76 in the openings 78 until the first part is forced from within the cavity 56 in the second part 50.

The multiple part key 10 is assembled with a second embodiment hilt 30, again by grasping the lock end portion 21 of the shank 21 in one hand and the inner part 50 in the other hand. The hilt end portion 25 in aligned over the guideway portion 45 of the first part and the two pressed together, as shown in FIG. 8, until the hilt end portion 25 is located in the guideway portion 45 with the shoulder portion 66 extending through the indentation 61 and the end 26 abutting the end wall 37. The shank 20 is now released by the one hand which picks up the second part 50. The second part 50 is located with its rear edge 52 adjacent the pointed end 22 of the shank 20 nd its guideway portion 55 aligned therewith, as is shown in FIG. 8. The second part 50 is slid over the shank 20 with the shank 20 passing through the guideway portion 55 thereof while the first part 50 passes into the cavity 56 until the front edge 41 thereof bottoms against the second part 50 and the tabs 76 extend into the openings 78 of the second part 50 as is shown in FIG. 9. In this position, the sides 54 of the second part 50 holds the shank 20 in the guideway 35 and over the shoulder portion 66 while the location of the tabs 76 within the openings 78 to interlock the two parts 40 and 50 together again until driven apart.

Thus, the multiple part key 10, according to this invention, is quickly, easily, and inexpensively assembled from an extruded or otherwise formed shank and unitary or two-part hilt into a key for a conventional lock.

I claim:

1. A multiple part key for use in a conventional lock comprising:
   a key shank having one end portion suitably shaped for insertion into the lock and having an opposite end portion including a first stop surface facing toward said one end portion;
   a separate hilt having a key shank guideway therein which opens to a surface thereof for receiving the opposite end portion of the shank therein; and
   mounting means associated with both the key shank and hilt for securing the two together to form a completed key, said mounting means including a resilient tongue member protruding into said guideway and having a ramp portion generally inclined to the major axis of said guideway and facing outwardly of said guideway and a shoulder presenting an inwardly facing second stop surface, whereby assembly of said shank and hilt is facilitated through the engagement of said shank opposite end and said ramp portion on insertion of said shank one end portion into said hilt guideway and separation of said shank and hilt is prevented by abutment of said first and second stop surfaces.

2. The invention as in claim 1 wherein the mounting means includes the provision of said ramp portion and tongue member so that bending of said tongue member laterally of said guideway is promoted upon the insertion of said shank opposite end into said guideway but such lateral bending of said tongue member is not promoted upon an attempted separation of said hilt and shank.

3. The invention as in claim 1 wherein the hilt tongue member is formed integrally of the hilt and separated therefrom by a cutout around three sides to facilitate a fourth attached side pivoting on the hilt.

4. A multiple part key for use in a conventional lock comprising:
   an elongated key shank having one end portion suitably shaped for insertion into the lock and having an opposite end portion having an indentation therein;

a separate hilt having an elongated key shank guideway therein which opens to a surface thereof for receiving the opposite end portion of the shank therein, said hilt being formed of a resilient material; and mounting means associated with both the key shank and hilt for securing the two together to form a completed key, said mounting means including the provision of holding means in the hilt for extending into the indentation in the opposite end portion of the shank to hold the shank therein when received in the guideway, said holding means including the provision of a shoulder portion in the hilt which protrudes into the guideway and into the indentation in the shank, when inserted into the guideway, to hold the shank therein; wherein:

the hilt is formed of two parts, a first part and a second part;

the first part has the major portion of the guideway formed therein and has the shoulder protruding into the guideway to extend into the indentation in the shank when the shank is located therein; and the second part has the rest of the guideway and mates with the first part after the shank is received therein to complete the hilt and maintain the shank therein.

5. The invention as in claim 4 wherein interlocking means is provided for interlocking the first and second parts upon mating thereof.

6. The invention as in claim 5 wherein the interlocking means includes a springable tab on one part and a mating opening on the other part, the mating of said parts locating the tab in the opening to interlock the two parts together.

7. The invention as in claim 4 wherein the second part has an open ended cavity opening to the opposite side thereof from the portion of the guideway located therein, and wherein the first part is sized to be received in the cavity after the shank is received in the first part, whereby the shank extends from the first part through the guideway portion in the second part while the second part maintains the shank within the first part.

8. The key of claim 3 wherein said mounting means comprises:

at least two such resilient tongue members protruding into said guideway from opposite sides thereof and said shank is provided with such stop surface such that said shank is held between two tongue members against withdrawal from said guideway.

9. A two part key for use in a conventional lock comprising:

a key shank having one end portion suitably shaped for insertion into the lock and having an opposite end portion; and a one piece molded plastic head having a key shank guideway therein for receiving said opposite end portion of said shank, said head having an integrally formed resilient tongue means normally protruding into said guideway with a ramp portion thereof facing outwardly of said guideway and presenting a stop surface generally transverse to and facing inwardly of said guideway whereby assembly of said shank and head is facilitated but subsequent withdrawal of said shank from said head is prevented.

10. The two part key of claim 9 wherein:
at least two such resilient tongue means are formed integrally of said head on opposite sides of said guideway in opposed relationship to receive said shank one end portion therebetween.

11. A multiple part key assembly for use in a conventional lock comprising:

a key shank;

a separately formed hilt having a key shank guideway therein for receiving said shank therein; and mounting means associated with both said key shank and hilt for securing the two together in a generally permanent assembly thereof to form a completed key, said mounting means including a first planar stop surface provided on said shank in a plane generally transverse to said shank and a resilient tongue member on said hilt protruding into said guideway, and said tongue member having a ramp portion facing outwardly of said guideway and presenting a planar second stop surface generally transverse to and facing inwardly of said guideway whereby upon insertion of said shank into said guideway said shank initially engages said ramp portion to deform said tongue member laterally of said guideway until said first and second stop surfaces are aligned.

12. A multiple part key comprising:

a shank having an aperture extending laterally therethrough adjacent one end thereof;

a key head having a guideway to receive said shank one end therein; and a pair of opposed resilient tongue members provided on said head on opposite sides of said guideway, each including a shoulder normally protruding into said guideway, whereby insertion of said shank one end into said guideway deforms said opposed tongue members apart and laterally of said guideway until said shank aperture is aligned with said shoulders whereupon said shoulders engage in said aperture to thereafter prevent withdrawal of said shank from said head.

13. The key of claim 12 wherein:
said aperture is provided in a direction generally normal to the plane of generally parallel side walls of said shank and said shoulders each present a stop surface facing inwardly of said guideway in a plane generally normal to the major axis of said guideway.

14. The key of claim 12 wherein:
said head is molded of plastic material and said tongue members are formed integrally of and partially cut out of said head.

* * * * *